US012221706B2

(12) United States Patent
Rustici Venturini (10) Patent No.: US 12,221,706 B2
(45) Date of Patent: Feb. 11, 2025

(54) METHOD TO PRODUCE AN ARTICULATED AUTOMATIC OPERATOR DEVICE AND CORRESPONDING ARTICULATED AUTOMATIC OPERATOR DEVICE

(71) Applicant: I.M.A. INDUSTRIA MACCHINE AUTOMATICHE S.P.A., Ozzano dell'Emilia (IT)

(72) Inventor: Gabriele Rustici Venturini, Ozzano dell'Emilia (IT)

(73) Assignee: I.M.A. Industria Macchine Automatiche S.P.A., Ozzano dell'Emilia (IT)

( * ) Notice: Subject to any disclaimer, the term of this patent is extended or adjusted under 35 U.S.C. 154(b) by 840 days.

(21) Appl. No.: 17/426,188

(22) PCT Filed: Jan. 30, 2020

(86) PCT No.: PCT/IT2020/050011
§ 371 (c)(1),
(2) Date: Jul. 28, 2021

(87) PCT Pub. No.: WO2020/157780
PCT Pub. Date: Aug. 6, 2020

(65) Prior Publication Data
US 2022/0112590 A1  Apr. 14, 2022

(30) Foreign Application Priority Data
Jan. 30, 2019 (IT) .................. 102019000001321

(51) Int. Cl.
*C23C 4/08* (2016.01)
*B25J 18/00* (2006.01)
*C23C 4/129* (2016.01)

(52) U.S. Cl.
CPC ............... *C23C 4/08* (2013.01); *B25J 18/00* (2013.01); *C23C 4/129* (2016.01)

(58) Field of Classification Search
CPC .. C23C 4/08; C23C 4/129; B25J 18/00; B25J 9/04; B25J 11/00; B25J 19/007; B25J 19/0075
See application file for complete search history.

(56) References Cited

U.S. PATENT DOCUMENTS 5,019,686 A * 5/1991 Marantz ................. C23C 4/129
239/81
5,384,164 A * 1/1995 Browning ............... C23C 4/129
427/446

(Continued)

FOREIGN PATENT DOCUMENTS

EP  0937551 A1  8/1999
EP  0988939 A1  3/2000

(Continued)

OTHER PUBLICATIONS

International Search Report for corresponding application PCT/IT2020/050011 filed Jan. 30, 2020; Mail date Jul. 30, 2020.

(Continued)

*Primary Examiner* — Ryan J. Walters
(74) *Attorney, Agent, or Firm* — K&L Gates LLP (57) ABSTRACT

A method to produce an articulated automatic operator device treated on the surface with a corrosion-resistant material and/or to obtain surface properties resistant to CIP/SIP treatments, in particular in the field of the production and packaging of pharmaceutical products, where the device includes a plurality of articulated components rotatably connected to one another in correspondence with respective coupling interfaces, such that the method provides to make available casings suitable to be assembled together to make the articulated components, wherein the (Continued)

casings are made of a first material and subject each casing to a thermal spray treatment using solid powders of a second material accelerated in a supersonic gaseous jet to deposit a coating of said second material at least on the external surface of each of said casings.

15 Claims, 3 Drawing Sheets

(56) References Cited

U.S. PATENT DOCUMENTS

| | | | |
|---|---|---|---|
| 9,399,301 B2* | 7/2016 | Nakanishi | B25J 21/00 |
| 11,932,945 B2* | 3/2024 | Rustici Venturini | C23C 4/073 |
| 2017/0290632 A1 | 10/2017 | Nakatsu | |
| 2021/0122081 A1* | 4/2021 | Barykin | C23C 4/129 |
| 2022/0098716 A1* | 3/2022 | Rustici Venturini | C23C 4/073 |

FOREIGN PATENT DOCUMENTS

| | | |
|---|---|---|
| EP | 2929989 A1 | 10/2015 |
| JP | 5272955 B2 | 8/2013 |

OTHER PUBLICATIONS

Written Opinion for corresponding application PCT/IT2020/050011 filed Jan. 30, 2020; Mail date Jul. 30, 2020.

* cited by examiner fig. 1 fig. 2

METHOD TO PRODUCE AN ARTICULATED AUTOMATIC OPERATOR DEVICE AND CORRESPONDING ARTICULATED AUTOMATIC OPERATOR DEVICE

FIELD OF THE INVENTION

The invention concerns a method to produce an articulated automatic operator device, that is, a robot or an articulated arm provided with a plurality of components coupled one with respect to another in an articulated manner.

In particular, the present invention concerns a method to produce an articulated automatic operator device which can be used in the pharmaceutical sector, for example in machines for packaging pharmaceutical products, and be subjected to decontamination and sterilization treatments normally performed in this sector.

BACKGROUND OF THE INVENTION

Articulated automatic operating devices, or articulated robots, are known, which are used in different sectors in the state of the art to perform operations of different types instead of human operators. In the pharmaceutical sector, for example, it is known to use articulated automatic operators to package pharmaceutical products.

These robots are generally positioned inside chambers that define protected work environments that have to meet determinate cleanliness and sterility requirements, called "isolators" in this sector. Therefore, the chambers, together with the equipment contained in them, are generally subjected to intensive treatments to keep them in the required sterility conditions and eliminate possible contaminating substances. For example, it is known to subject these chambers to treatments that use hydrogen peroxide vapor, which however, while having a highly effective bactericidal, sporicidal and fungicidal action, has a high oxidizing power that can damage the surfaces of the pieces of equipment present in these chambers.

The known robots used in this sector, in order to withstand these decontamination and sterilization treatments, and guarantee protection for drive members and the circuits associated with the various articulated components, are generally made with a solid body of stainless steel, and therefore are very heavy.

However, for productivity needs, the robots in question have to be moved at high speed and guarantee, on each occasion, a precise positioning of the terminal end of the articulated robot.

The heavy weight of the articulated components entails the need to have, on the one hand, more powerful movement members and motors, in order to guarantee the desired speed of movement, and on the other hand, a very precise system to control the trajectories, in order to ensure that the terminal end of the robot immediately positions itself in the desired position without undesired oscillations.

To try to resolve this problem, it is known to make robots consisting of articulated components having a base body made of a light material which acts as a substrate, which is coated with a material for coating and protecting the substrate.

For example, articulated robots are known whose components are made of aluminum, for example coated with a layer of paint, or subjected to treatments for anodizing the aluminum, or provided with galvanic coatings, for example based on Chrome (Cr), Nickel (Ni), or other suitable metals. One example of this type of method to produce articulated robots whose components are made of aluminum is described by the Japanese patent JP 5272955 B2.

Solutions are also known that provide to coat the various components by means immersing them in a bath of metal, plastic or resin material. One disadvantage of these solutions, however, is that in this way the coating is applied both on the external surface and also on the internal surface of the components, and therefore large quantities of coating material are required.

One purpose of the present invention is to perfect a method to produce an articulated automatic operator device able to be used in isolators in the pharmaceutical sector which overcomes at least some of the disadvantages of the state of the art.

In particular, one purpose is to perfect a method to produce an articulated automatic operator device which allows to obtain an articulated operator that is light and at the same time suitable to resist intensive treatments.

Another purpose is to perfect a method to produce an articulated automatic operator device which allows to perform operations of maintenance and replacement of an articulated component, or possibly of the drive members or circuits, without damaging the surfaces which on each occasion are subjected to decontamination and sterilization treatments.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the invention or variants to the main inventive idea.

Embodiments described here concern a method to produce an articulated automatic operator device comprising a plurality of articulated components rotatably connected to each other, and each comprising inside it drive members and/or electrical or electronic components and/or pipes for fluids, configured to move the articulated automatic operator, suitable to be used in controlled atmosphere environments, in particular in the field of the production and packaging of pharmaceutical products.

In particular, the articulated automatic operator device is treated on the surface with a corrosion-resistant material and/or to obtain surface properties resistant to Clean in Place (CIP) and/or Sterilize in Place (SIP) treatments, in particular in the field of production and packaging of pharmaceutical products, which provide to use, as a sterilizing agent, also Vapor Phase Hydrogen Peroxide (VPHP), which is particularly aggressive and tends to oxidize the surfaces which it comes into contact with.

The method according to the invention comprises a step in which it is provided to make available casings suitable to be assembled together to make the articulated automatic operator. According to some embodiments of the method provided here, the casings are made of a first material chosen from a group comprising aluminum (Al), magnesium (Mg), titanium (Ti), steel, or alloys thereof, composite materials with a polymer matrix, carbon fibers, or combinations thereof.

Furthermore, in accordance with some embodiments of the present invention, each casing is hollow and is provided with a housing compartment suitable to receive the drive members and/or the electric or electronic components and/or pipes for fluids as above. In some embodiments, each casing is provided with at least one respective coupling edge configured to be coupled with a corresponding coupling edge of another casing, to compose one of the articulated components in a condition of isolation with respect to the outside environment.

The method according to the invention then provides to subject each casing to a thermal spray treatment, by means powders of a second material accelerated in a supersonic gaseous jet, the second material being chosen from a group comprising one or more of either stainless steel, cobalt-chromium metal alloy, nickel alloy, material with a polymer matrix, a metal-ceramic composite material, to deposit a coating of the second material at least on the external surface of each component.

According to some embodiments, the thermal spray treatment is a cold spray treatment in which solid powders of the second material are accelerated in a supersonic gaseous jet, and are made to violently impact the surfaces to be coated.

According to other embodiments, the thermal spray treatment is a high velocity oxygen-fuel (HVOF) coating spray treatment, in which at least partly melted particles of the second material are accelerated in a supersonic gaseous jet obtained from the combustion of oxygen and a fuel, in particular at high temperature and high speed, in order to then be sprayed on the surface to be coated.

Compared to other thermal spray treatments, in the cold spray treatment and in the high velocity oxygen-fuel (HVOF) coating spray treatment a large part of the energy supplied to the particles is of the kinetic rather than the thermal type, therefore it is advantageously possible to obtain a reduction of particles that oxidize during working, allowing to obtain a highly resistant final coating.

According to embodiments described here, the method in particular provides to subject each casing to the thermal spray treatment separately, and to deposit the coating at least on the respective external surfaces and on the respective coupling edges.

Subsequently, the method according to the present invention provides to house the drive members and the electric or electronic components and/or pipes for fluids in the respective housing compartments of each casing subjected to thermal spraying in order to make the articulated components; and to assemble the respective articulated components with respect to each other in correspondence with the respective coupling interfaces to make the articulated automatic operator device.

According to some embodiments, a casing of the articulated component is a casing frame provided with an access aperture to the housing compartment and another casing of the articulated component is a covering element suitable to close the access aperture as above.

Consequently, in the present description the expression "composing an articulated component in a condition of isolation" comprises both the reciprocal coupling of two casings, for example one casing frame and one respective covering element, to define a single articulated component, so that the housing compartment is isolated with respect to the external environment, and also the coupling of two casings, in particular two casing frames, of respective subsequent articulated components, in which the respective housing compartments are operatively connected with each other, but in any case isolated with respect to the outside.

Advantageously, the step of also completely coating the edges associated with the coupling interface and the access aperture allows to separate the articulated components and/or to access the respective internal housing compartments, in order to carry out maintenance operations without the risk of damaging the coating.

The method according to the invention therefore allows to produce articulated automatic operator devices that can be inserted and used inside the protected chambers of the isolators, and be subjected to CIP and/or SIP treatments inside them without being damaged.

At the same time, the internal surface of the articulated component, which is not affected by the decontamination and sterilization treatments, remains without coating, thus allowing a considerable economic saving.

According to some embodiments, the method provides to spray on the external surface a mixture of gas and solid particles of the second material with a speed comprised between 300 m/s and 1400 m/s and to retain the casing on each occasion in a fixed and stable position by means of supports suitable to resist the force exerted by the mixture of gas and particles.

According to some embodiments, the method can provide to insert a sealing element between the casing frame and the respective covering element and/or between respective coupling edges of the coupling interfaces, to guarantee a sealed closure of the respective articulated component.

According to these embodiments, there can be provided an annular housing seating made in the thickness of the coupling edge in correspondence with the access aperture and/or at least one of the coupling interfaces, suitable to house an annular sealing element, and the method can provide to coat the coupling edge of the access aperture and/or of the coupling interface up to the external margin of the housing seating.

According to some embodiments, for the cold spray treatment, the method provides to use a spray nozzle mounted on an articulated arm or a numerical control machine having at least four working axes, and to follow with it the development of the surface to be treated. In this way, it is possible to precisely follow the development of the external surface and of the edges of the casing frame, and on each occasion suitably direct the spray nozzle with respect to the surface.

According to some embodiments, the method provides to spray the material onto the surface to be treated with an angle of incidence comprised between ±45° with respect to the perpendicular of the external surface and/or of the coupling edges. The angle of incidence can vary as a function of the radius of curvature of the surface to be treated, or as a function of possible uneven parts or edges present thereon, so as to direct the mixture of gas and particles of the second material in a targeted manner and obtain a substantially uniform coating.

According to some embodiments, the method provides to deposit, with each spraying action, a layer of material with a thickness comprised between about 15 µm and about 100 µm.

Embodiments described here also concern an articulated automatic operator device comprising a plurality of articulated components rotatably connected to each other in correspondence with respective coupling interfaces, and each comprising inside them drive members and/or electrical or electronic components configured to move the articulated automatic operator, suitable to be used in environments with a controlled atmosphere, in particular in the field of the production and packaging of pharmaceutical products.

According to one aspect of the present invention, the articulated automatic operator device comprises a plurality of casings, suitable to be assembled together to make an articulated automatic operator, wherein the casings are made of a first material selected from a group comprising aluminum (Al), magnesium (Mg), titanium (Ti), steel, or alloys thereof, composite materials with a polymer matrix, carbon fibers, or combinations thereof, and each casing is hollow and provided with a housing compartment suitable to receive the drive members and the electric or electronic components and/or the pipes for fluids, wherein each casing is provided with at least one respective coupling edge configured to be coupled with a corresponding coupling edge of another casing, to compose one articulated component in a condition of isolation with respect to the outside environment.

According to another aspect of the present invention, at least one external surface of each casing comprises a coating made of a second material, which covers at least respective external surfaces of the casing and possibly the respective coupling edges. According to embodiments described here, the coating with the second material is obtained by means of thermal spraying using solid powders accelerated in a supersonic gaseous jet, and the second material is chosen from a group comprising one or more of either stainless steel, cobalt-chromium metal alloy, nickel alloy, material with a polymer matrix, a metal-ceramic composite material, carbon fiber, or other. In particular, the coating with the second material is obtained by means of the thermal spraying by cold spray treatment or by the oxygen-fuel coating spray treatment which have been described previously.

ILLUSTRATION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DESCRIPTION OF EMBODIMENTS

Figure 1:
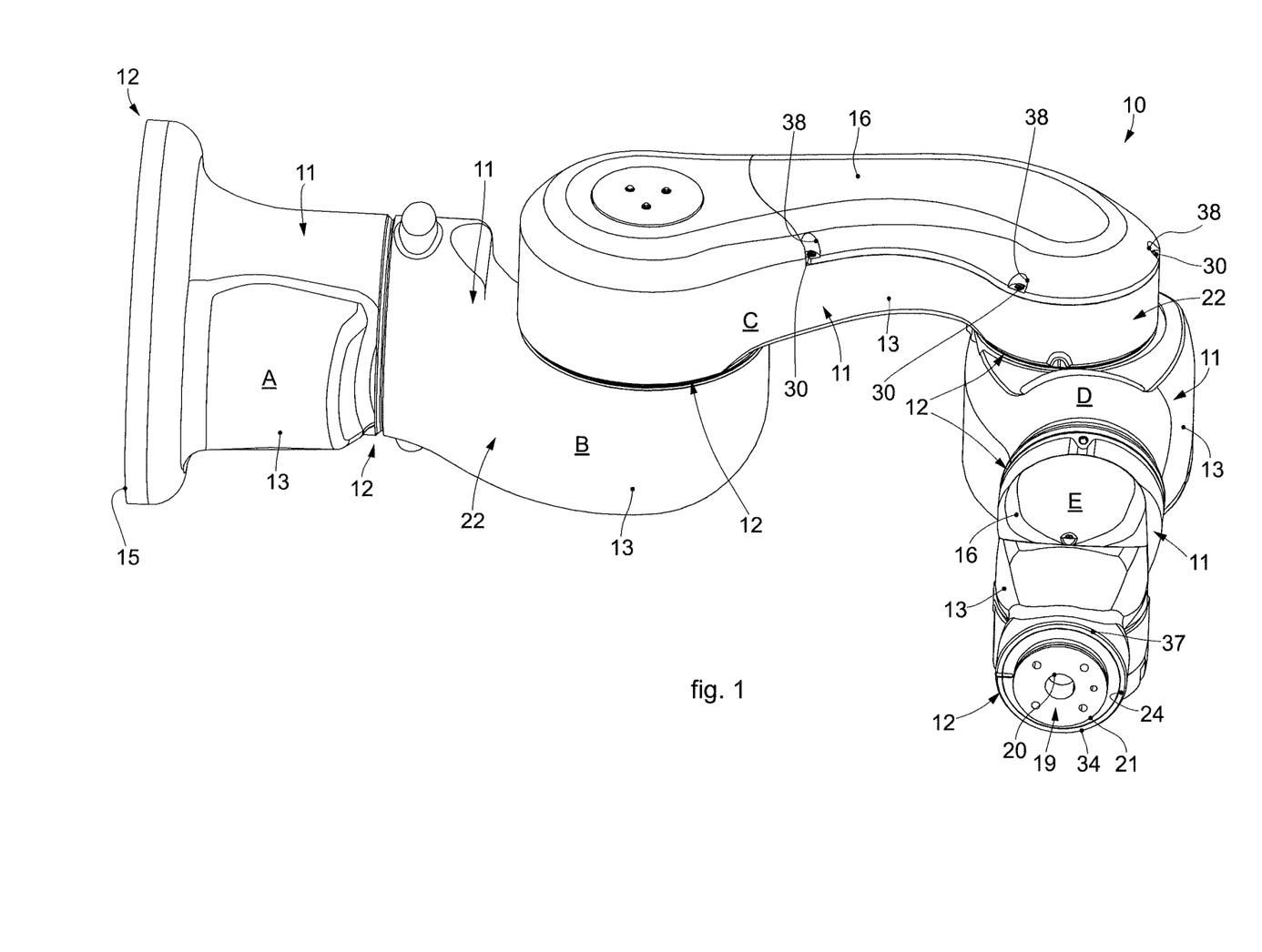
FIG. 1 is a schematic three-dimensional view of an articulated automatic operator device according to embodiments described here.
Figure 2:
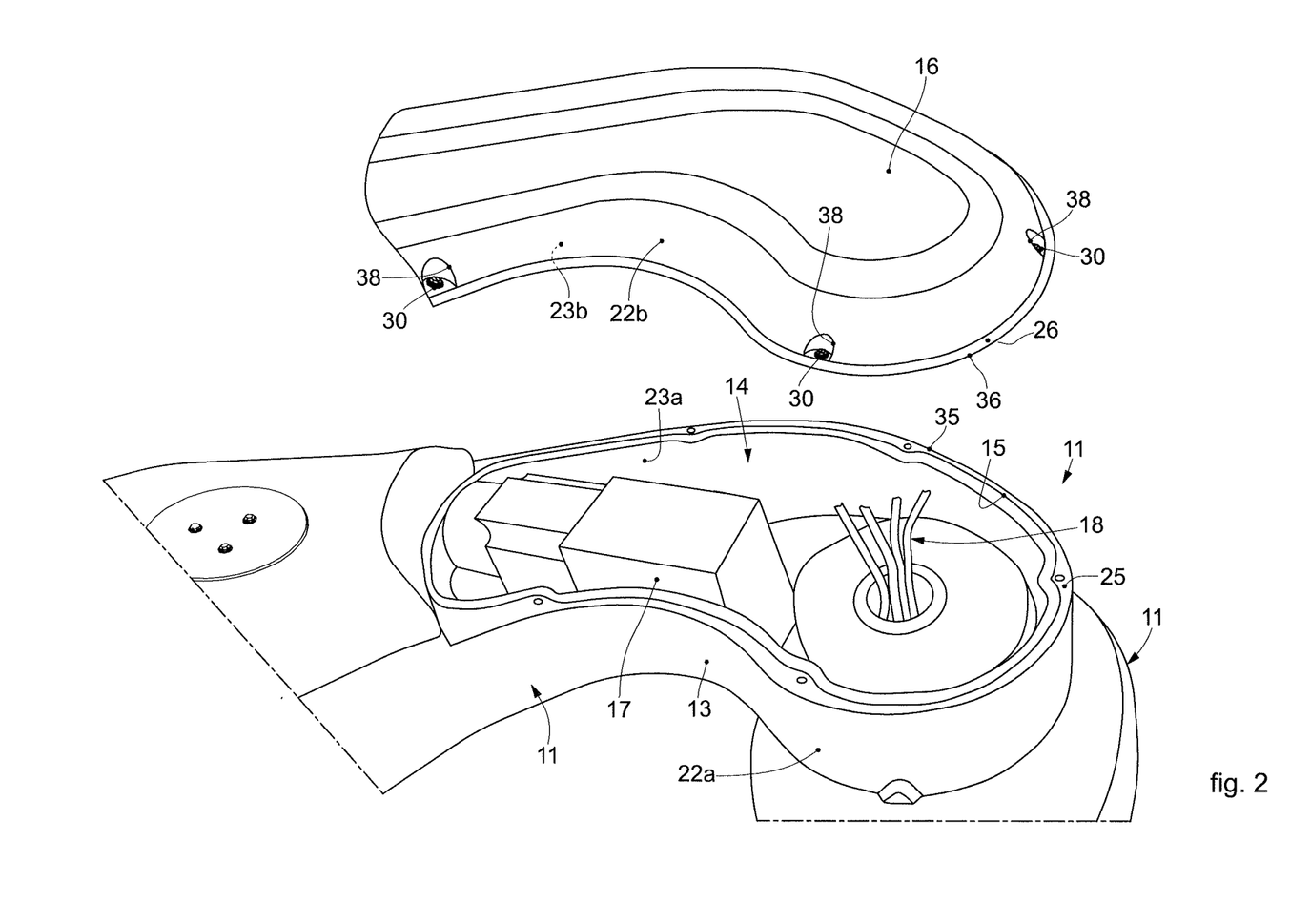
FIG. 2 is an exploded schematic three-dimensional view of a structural component of the operator device of FIG. 1.

Embodiments described here concern a method to produce an articulated automatic operator device 10, or articulated robot, of the type shown by way of example in FIGS. 1 and 2.

The articulated robot 10 comprises a plurality of articulated components 11 pivoted one to the other, and is in particular suitable to be used in the field of production and packaging of pharmaceutical products. That is to say, the articulated robot 10 can be used in isolated chambers, also called "isolators", which are separated from the outside environment and have to meet stringent sterility requirements to prevent possible contaminations of the pharmaceutical products themselves.

The articulated robot 10 in question can in particular be subjected to suitable decontamination and sterilization treatments, for example CIP and/or SIP treatments which provide the use of Vapor Phase Hydrogen Peroxide (VPHP), which has high oxidizing power with bactericidal, sporicidal and fungicidal action, without an oxidation of its external surface occurring, or possible damage to the components themselves.

By way of example, the articulated robot 10 shown in FIG. 1 has five articulated components 11, respectively indicated with the letters A, B, C, D, E, coupled in an articulated manner one after the other in correspondence with respective coupling interfaces 12.

According to some embodiments, in correspondence with the coupling interfaces 12 movement members, not shown, can be provided, configured to allow a relative rotation of the two articulated components 11 respectively coupled about a common axis of rotation.

It is not excluded, however, that the articulated robot 10 may have a smaller or greater number of articulated components 11, as a function of needs.

According to some embodiments, each articulated component 11 is at least partly hollow and is internally provided with a housing compartment 14 (FIG. 2) configured to house the drive members 17 and the electric and electronic circuitry 18 and/or the pipes for fluids, necessary for the movement of the articulated component 11 itself and for the transmission of power and data signals between the respective articulated components 11.

Each articulated component 11 also comprises at least one coupling interface 12 suitable to be coupled with a mating coupling interface 12 of another articulated component 11.

By means of the coupling interface 12, the electric circuits 18 of subsequent articulated components 11 can be connected to each other.

According to some embodiments, in the event the articulated component 11 is a component located in an intermediate position in the kinematic chain of the robot 10, this component will be provided with two coupling interfaces 12, each suitable to be coupled, on one side, with a respective adjacent articulated component 11, and on the other side with the articulated component 11 itself.

According to some embodiments, for example described with reference to FIG. 2, the articulated components 11 comprise hollow casings provided with the housing compartment 14.

According to some embodiments, at least one articulated component 11 comprises two casings coupled with each other in correspondence with respective coupling edges 25, 26.

According to some embodiments, one casing of the articulated component 11 is a casing frame 13 provided with an access aperture 15 to the housing compartment 14, and another casing of the articulated component 11 is a covering element 16 configured to selectively close the access aperture 15 and prevent access to the housing compartment 14.

According to some embodiments, the casing frame 13 performs a structural function, suitable to support the drive members 17 and the electric and electronic circuitry 18 and/or the pipes for fluids.

The casing frame 13 is delimited by a first external surface 22a, a first internal surface 23a, opposite the first external surface 22a, and by coupling edges 25 which connect the external surface 22a and the internal surface 23a to each other.

The covering element 16 comprises a second external surface 22b, a second internal surface 23b and coupling edges 26 which, in a closed and assembled condition of the articulated component 11, are facing and cooperate with the mating coupling edges 25 of the respective casing frame 13.

The respective coupling edges 25, 26 of the casing frame 13 and of the covering element 16, in the closed condition of the access aperture 15, are facing each other.

In a preferred embodiment, the shape of the surfaces 22, 23 is such as to confer on the articulated component 11, in the closed and assembled condition as above, in correspondence with the coupling edges 25, 26, a profile that is as beveled or radial as possible, without "sharp" edges.

The first external surface 22*a* and the second external surface 22*b* as a whole define an external surface 22 of the articulated component 11, and the first internal surface 23*a* and the second internal surface 23*b* as a whole define an internal surface 23 of the articulated component 11.

In a preferred embodiment, the external surface 22 is a convex surface, as much as possible without discontinuities thereon, such as recesses, hollows, ridges or suchlike. In fact, as will become evident from the following description, such a conformation of the external surface 22 allows for a better result of the spraying step.

The covering element 16 can be connected and attached to the casing frame 13 by means of removable attachment members 30. In one embodiment, the external surface 22 of the articulated component 11 can comprise a plurality of recesses 38, each intended to receive a respective attachment member 30.

In alternative embodiments, the covering element 16 can be connected and attached to the casing frame 13 by means of a mechanical connection by interference, for example by interlocking. In this case, the attachment members 30 are not provided and the external surface 22 of the articulated component 11 can be without the recesses 38.

In the case of a base structural component 11, for example the structural component 11 indicated with the letter A, it can be provided that the access aperture 15 coincides with the coupling interface 12 and is connected directly to a control tower, not shown.

According to some embodiments, the coupling interface 12 comprises a coupling surface 19 suitable to cooperate, during use, with a mating coupling surface 19 of another structural component 11.

According to some embodiments, a through hole 20 is made in the coupling surface 19, through which the electric circuits 18 can be fed from the respective housing compartment 14.

The coupling surface 19 comprises an external edge 21 which, in an assembled condition of the articulated automatic operator 10 is disposed facing a respective external edge 21 of another coupling interface 12.

According to some embodiments, the external edge 21 defines a corner 34 with the external surface 22*a* of the casing frame 13, which has a substantially stepped shape.

According to some embodiments, between the respective coupling interfaces 12 of two directly adjacent articulated components 11, there can be provided a sealing element, not shown, for example an annular gasket, configured to guarantee a sealed coupling between the two articulated components 11.

According to some embodiments, at least one of the reciprocally facing coupling interfaces 12 can be provided with an annular housing seating 24 configured to house the sealing element.

According to some embodiments, the housing seating 24 is made in the thickness of the wall of the casing frame 13.

According to some embodiments, the coupling edges 25 of the casing frame 13 extend on a transverse plane with respect to the profile of the external surface 22*a*, defining with it a substantially stepped corner 35.

According to some embodiments, the coupling edges 26 of the covering element 16 extend on a transverse plane with respect to the profile of the external surface 22*b*, defining with it a substantially stepped corner 36.

According to some embodiments, in at least one of the coupling edges 25, 26 a housing seating 27 is made, with an annular shape and configured to house a sealing element 28.

According to some embodiments, the housing seating 27 can be for example made in the thickness of the wall of the casing frame 13.

According to some embodiments, the housing seating 27 can be made in the thickness of the wall of the casing frame 13 at a determinate distance from the external surface 22.

For example, the housing seating 27 can be made in an intermediate position of the coupling edge 25, 26, or possibly in a position close to, or in the proximity of, the margin of the access aperture 15.

According to some embodiments, the casing frame 13 and/or the covering element 16 can be made of a first material selected from a group comprising one or more of aluminum (Al), magnesium (Mg), titanium (Ti), steel, or their alloys, composite materials with a polymer matrix, carbon fibers, or combinations thereof, or other rigid and light materials.

According to some embodiments, the surface finish of the casings has a certain minimum surface roughness which allows the particles that will be sprayed in the spraying process to deposit and remain attached to the external surface 22. Preferably, the minimum surface roughness Ra of the external surface 22 of the casings, that is, of the casing frame 13 and/or of the covering element 16, is comprised between about 1.6 and about 12.5 μm.

According to some embodiments, the casings also comprise a coating 29 of a second material selected from a group consisting of a cobalt-chromium alloy, such as for example stellite, stainless steel, a material with a polymer matrix, such as for example polyetheretherketone (PEEK), nickel alloy, metal-ceramic composite material, carbon fibers, or other material suitable to be subjected to decontamination and sterilization treatments without suffering damage or possible oxidations.

The coating 29 performs the function of protecting the first material, which therefore, since it does not itself need to have characteristics of tolerance to intensive treatments, can be chosen from the light materials indicated above, and, as a function of the type of material used, the casings, that is, the casing frame 13 and possibly the covering element 16, can be made with reduced thicknesses. According to some embodiments, the coating 29 covers both the respective external surfaces 22*a*, 22*b*, and the respective counter-facing coupling edges 25, 26 of the casings, that is, of the casing frame 13 and of the covering element 16, and also the external edges 21 of the casing frame 13.

In other words, each articulated component 11 has the coating 29 on its entire external surface 22, as well as on the coupling edges 21, 25, 26 associated with the coupling interface(s) 12 and with the access aperture 15.

According to some embodiments, the internal surface 23 of the articulated component has no coating 29.

According to some embodiments, in the event the housing seatings 24, 27 are present, the coating 29 extends up to an external margin 37 of the housing seatings 24, 27 themselves.

Embodiments of a method to produce the articulated robot 10 will be described below.

The method according to the invention provides to:
make available casings suitable to be assembled together to make the articulated components 11 of the articulated automatic operator 10;
subjecting each casing to a thermal spray treatment using solid powders of a second material accelerated in a supersonic gaseous jet, to deposit a coating 29 at least on the external surface 22 of each casing and on the respective coupling edges 21, 25, 26.

According to some embodiments, the thermal spray treatment can be chosen between a cold spray treatment, and a high velocity oxygen-fuel (HVOF) coating spray treatment.

According to some embodiments, the method provides to subject to the cold spray treatment or to the HVOF treatment, the respective external surfaces 22a, 22b of the articulated casing frame 13 and of the possible covering element 16, and the coupling edges 21, 25, 26 respectively associated with the coupling interfaces 12 and the access aperture 15.

Figure 3A:
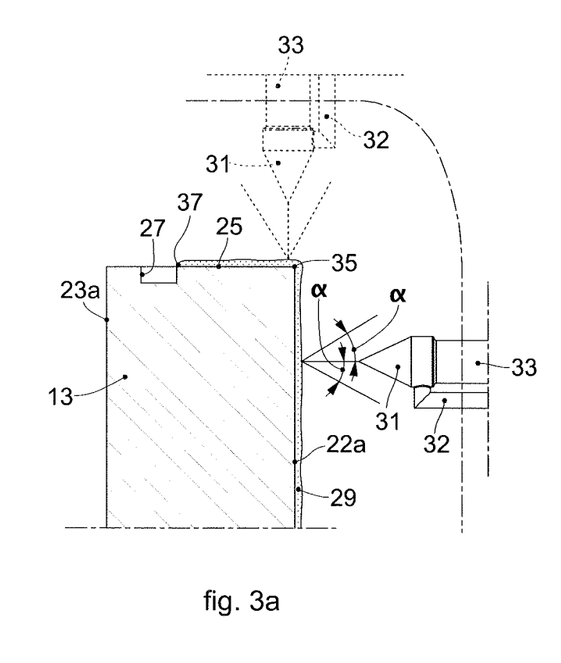
FIGS. 3a-3c are schematic section views of successive steps of a method to produce an articulated automatic operator according to embodiments described here.

The cold spray treatment provides to spray, by means of a spray nozzle 31, a mixture formed by a gas which carries powders or solid particles of the material to be used to form the coating 29, toward the surface to be treated.

According to possible solutions, at least a part of the carrier gas is heated up to temperatures comprised between 200° C. and 1200° C.

According to example embodiments, a part of gas can be heated and conveyed toward the spray nozzle 31 through a first conduit 32, while the remaining part of the carrier gas can be kept at room temperature and is made to pass through a tank, not shown, containing powders of the second material, and conveyed toward the spray nozzle 31 through a second conduit 33.

According to some embodiments, in the spray nozzle 31 the powders in the gas flow are accelerated and projected at supersonic speed, generally comprised between 300 m/s and 1400 m/s, toward the surface to be treated.

According to some embodiments, the pressure of the carrier gas can be comprised between 5 bar and 100 bar as a function of the type of material and the size of the particles that are carried.

According to some embodiments, nitrogen or argon can be used, for example, as carrier gases.

Advantageously, the spray nozzle 31 can have a converging-diverging shape which favors the acceleration of the powders and of the carrier gas.

When the accelerated particles impact the surface to be treated, the impact determines a deformation of the treated surface, generating a stable and permanent coupling between it and the particles of material.

According to some embodiments, with each passage of the spray nozzle 31 on the surface to be treated, a layer of material having a thickness comprised between about 15 μm to about 100 μm can be deposited. According to some embodiments, the method can provide to deposit a plurality of overlapping layers, until the coating 29 with a desired thickness is obtained.

According to some embodiments, the coating 29 can comprise a plurality of layers made by means of cold spray treatment, in which the subsequent layers can be made with the same material, or with different materials, as a function of needs.

According to some embodiments, the high velocity oxygen-fuel (HVOF) coating spray treatment provides to heat and accelerate particles of the second material by means of a gas flow obtained by the combustion of oxygen and a fuel in a combustion chamber.

The gas flow obtained from the combustion is accelerated up to a speed even higher than 2,000 m/s. The powders of the second material are injected into the gas flow, which are melted and accelerated up to a speed of about 1,000 m/s and finally are ejected through a spray nozzle 31 toward the surface to be coated. When the particles impact the surface, thanks to the high kinetic energy they have, they quickly solidify giving rise to lamellar structures that form a dense coating.

According to some embodiments, also in the case of the HVOF treatment, it can be provided to deposit a plurality of overlapping layers, until the coating 29 having a desired thickness is obtained, possibly modifying the type of material of the subsequent layers as a function of needs.

According to some embodiments, the casing frames 13 can already be supplied in a disassembled condition.

According to other embodiments, the articulated components 11 can be supplied in an assembled condition in the form of an articulated robot 10, and can subsequently be dismantled to separate the casing frames 13 from each other, possibly also removing the drive members 17 and electric circuits 18, and/or the pipes for fluids, if present.

According to some embodiments, the coating 29 is formed by the second material as above, and is chosen from a group consisting of a cobalt-chromium alloy, such as for example stellite, nickel alloy, stainless steel, material with a polymer matrix, such as for example polyetheretherketone (PEEK), a metal-ceramic composite material, carbon fibers, or other material suitable to be subjected to decontamination and sterilization treatments without suffering damage or oxidation.

According to some embodiments, the method provides to treat the casing frame 13 and the cover element 16 separately.

According to a possible embodiment, the method provides to stably position the casings, for example the casing frame 13 and/or the covering element 16, so as to prevent unwanted movements thereof caused by the pressure exerted by the mixture of gas and particles of the second material.

According to some embodiments, the method can provide to position and hold in position the casing frame 13 and/or the covering element 16 by means of supports having respectively mating shapes, such as to protect and cover the respective internal surfaces 23a, 23b.

The method according to the invention provides to use a spray nozzle 31, for example installed on an anthropomorphic arm, or a Computer Numerical Control (CNC) machine, both not shown, having at least four working axes. In particular, according to some embodiments, the method provides to follow on each occasion with the spray nozzle 31 the development of the external surface 22a, 22b of the casing frame 13 and of the covering element 16, and the respective coupling edges 21, 25, 26, defining the substantially stepped corners 34, 35, 36 with the respective external surfaces 22a, 22b.

According to possible solutions, the spray nozzle 31 can follow the profile of the surface to be treated on the basis of a path that is predefined and pre-set on the basis of the shape of the element being worked.

According to a variant, the path and orientation of the spray nozzle 31 can be defined in real time, for example by processing images acquired by 3D cameras, which are also installed on the same anthropomorphic arm that supports and moves the spray nozzle 31.

According to possible variants, it can also be provided that the element being worked and the spray nozzle 31 move with relative motion with respect to each other. For example, it can be provided that the element being worked translates in one direction and that the spray nozzle 31 moves on three axes, so that the combination of the respective movements provides the degrees of freedom of an arm that has at least four axes.

According to some embodiments, the method provides to direct the spray nozzle 31 so as to spray the second material with an angle of incidence a comprised between ±45° with respect to the direction orthogonal to the external surface 22a, 22b and to the coupling edges 21, 25, 26 (FIG. 3a).

Thanks to this angle of incidence a, it is possible to direct the mixture of gas and particles of the second material in a targeted manner even in correspondence with possible uneven parts of the surface to be treated, and in particular in correspondence with the corners 34, 35, 36 between the external walls 22a, 22b and the respective coupling edges 21, 25, 26, so as to obtain a coating 29 with homogeneous thickness.

According to some embodiments, in the event possible accumulations of the second material form in correspondence with the corners 34, 35, 36 or in correspondence with possible hollows or protrusions of the external surface 22, the method according to the invention can provide to remove these accumulations by means of a suitable tool, immediately after the deposit of the coating 29 itself and substantially in a continuous manner.

According to some embodiments, the tool can be installed adjacent to the spray nozzle 31, so as to act on the surface just hit by the mixture of gas and particles during the movement of the spray nozzle 31 itself.

According to some embodiments, after having made the coating 29 on the external surfaces 22a, 22b and the coupling edges 21, 25, 26 of the casing frame 13 and of the possible covering element 16, the method provides to assemble the articulated robot 10.

In particular, the method provides to install, through the access aperture 15, the respective drive members 17 and the electric and/or electronic components 18 in the respective housing compartments 14 of each casing frame 13 of the articulated components 11, and subsequently close the possible access aperture 15 with the covering element 16. Finally, the method provides to rotatably connect and assemble with respect to each other the respective articulated components 11 in correspondence with the respective coupling interfaces 12, in order to produce the articulated automatic operator device 10.

Figure 3B:
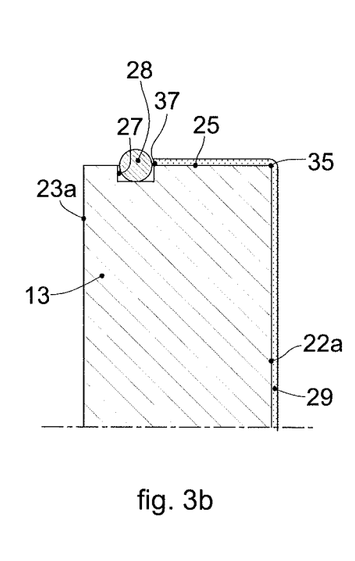
Figure 3C:
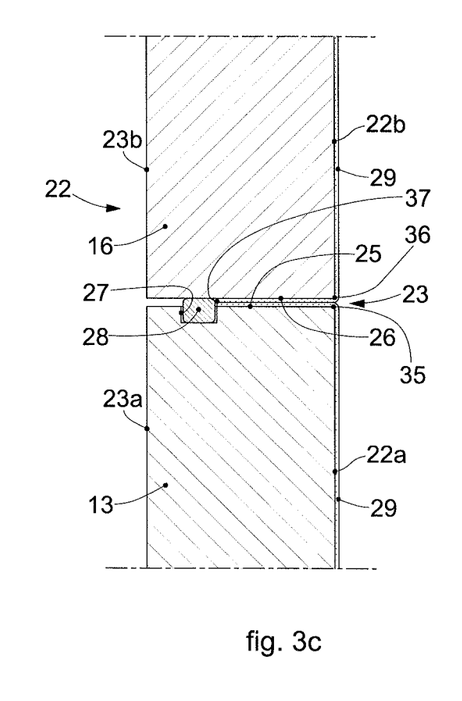

According to some embodiments, the method can provide to insert a sealing element 28 between the casing frame 13 and the respective covering element 16 and/or between respective coupling edges 21 of the coupling interfaces 12, in order to guarantee a sealed closure of the respective articulated component 11 (FIG. 3b).

According to some embodiments, in the event a housing seating 24, 27 for the sealing element 28 is present on at least one edge 21, 25, 26, the method provides to coat the respective edge 21, 25, 26 from the external corner 34, 35, 36 up to at least one external margin 37 of the housing seating 24, 27.

It is clear that modifications and/or additions of parts may be made to the production method and to the articulated automatic operator device 10 as described heretofore, without departing from the field and scope of the present invention.

It is also clear that, although the present invention has been described with reference to some specific examples, a person of skill in the art shall certainly be able to achieve many other equivalent forms of production method and articulated automatic operator device 10, having the characteristics as set forth in the claims and hence all coming within the field of protection defined thereby.

The invention claimed is:

1. A method to produce an articulated automatic operator device treated on the surface with a corrosion-resistant material so as to obtain a surface resistant to cleaning or sterilizing treatments, in the field of the production and packaging of pharmaceutical products, the device comprising a plurality of articulated components rotatably connected to one another in correspondence with respective coupling interfaces, said articulated components comprising inside them drive members and/or electric or electronic components and/or pipes for fluids, wherein said method comprises:

providing casings suitable to be assembled together to make the articulated components of the articulated automatic operator device, wherein the casings are made of a first material chosen from a group comprising aluminum, magnesium, titanium, steel, or alloys thereof, composite materials with a polymer matrix, carbon fibers, or combinations thereof, each casing being hollow and provided with a housing compartment suitable to receive said drive members and/or electric or electronic components and/or pipes for fluids, wherein each of said casings is provided with at least one respective coupling edge configured to be coupled with a corresponding coupling edge of another casing, to compose one of said articulated components in a condition of isolation with respect to the outside environment;

subjecting each casing to a thermal spray treatment using solid powders of a second material accelerated in a supersonic gaseous jet, said second material being chosen from a group comprising one or more of either stainless steel, cobalt-chromium metal alloy, nickel alloy, material with a polymer matrix, a metal-ceramic composite material, to deposit a coating of said second material at least on the external surface of each of said casings; and, after the spray treatment, said method provides to:

make said drive members and/or electric or electronic components and/or pipes for fluids to be housed in the respective housing compartments of each of said casings in order to make said articulated components;

assemble said respective articulated components with respect to each other in correspondence with the respective coupling interfaces to make said articulated automatic operator device, wherein said thermal spray treatment is selected from:

a cold spray treatment in which solid powders of said second material are accelerated in a supersonic gaseous jet;

a high velocity oxygen-fuel coating spray treatment in which at least partly melted particles of said second material are accelerated in a supersonic gaseous jet obtained from the combustion of oxygen and a fuel.

2. The method as in claim 1, wherein said thermal spray using solid powders also deposits a coating of said second material on the respective coupling edges.

3. The method as in claim 1, wherein a casing of one of said articulated components is a casing frame provided with an access aperture to said housing compartment and another casing of another one of said articulated components is a covering element suitable to close said access aperture.

4. The method as in claim 3, wherein said cold spraying provides to spray on said external surfaces and said coupling edges a mixture of a gas which transports solid particles of said second material with a speed comprised between 300 m/s and 1400 m/s and to retain said casing on each occasion in a fixed and stable position by means of supports suitable to resist the force exerted by said mixture of gas and particles.

5. The method as in claim 4, wherein it provides to heat at least a part of said gas which carries said solid particles to temperatures of about 200-1100° C.

6. The method as in claim 4, wherein said gas which carries said solid particles has a pressure comprised between 5 bar and 100 bar.

7. The method as in claim 1, further comprising inserting a sealing element between respective coupling edges of said casings and/or between respective edges of said coupling interfaces of adjacent articulated components to guarantee a sealed closure of said housing compartments of said articulated components.

8. The method as in claim 7, wherein on at least one of said edges a housing seating is provided, configured to house said sealing element, and said method including coating said coupling edge with said coating up to an external margin of said housing seating.

9. The method as in claim 1 including using a spray nozzle installed on an anthropomorphic arm and/or a numerical control machine having at least four working axes, and to follow with said spray nozzle a development of said external surface of each casing and of said coupling edges and a substantially stepped development of the corners defined between the edges and the respective external surface to which they are connected.

10. The method as in claim 9, including positioning said spray nozzle in such a way as to spray said second material with an angle of incidence comprised between ±45° with respect to a direction orthogonal to said external surface and to said coupling edges.

11. The method as in claim 9, wherein, if accumulations of said second material are formed in correspondence with said corners defined between said external surface and said coupling edges, or in correspondence with possible hollows or protrusions of said external surface, the method includes removing said accumulations by means of a suitable tool, immediately after said second material has been deposited, continuously during the movement of said spray nozzle.

12. An articulated automatic operator device, treated on the surface with a corrosion-resistant material so as to obtain a surface resistant to cleaning or sterilizing treatments, in the field of production and packaging of pharmaceutical products, comprising a plurality of articulated components rotatably connected to each other in correspondence with respective coupling interfaces, said articulated components comprising inside them drive members and/or electrical or electronic components and/or pipes for fluids, wherein the articulated automatic operator device comprises a plurality of casings assembled together to make the articulated components of the articulated automatic operator device, wherein said casings are made of a first material selected from a group comprising aluminum, magnesium, titanium, steel, or alloys thereof, composite materials with a polymer matrix, carbon fibers, or combinations thereof, each casing being hollow and provided with a housing compartment suitable to receive said drive members and/or electric or electronic components and/or pipes for fluids, wherein each of said casings is provided with at least one respective coupling edge configured to be coupled with a corresponding coupling edge of another casing, to compose one of said articulated components in a condition of isolation with respect to the outside environment, in that at least one external surface of each of said articulated components comprises a coating made of a second material, said coating covering at least respective external surfaces of said casings; wherein said coating with said second material is obtained by means of thermal spraying by accelerated powders in a gaseous jet, said second material being chosen from a group comprising one or more of either stainless steel, cobalt-chromium metal alloy, nickel alloy, material with a polymer matrix, a metal-ceramic composite material and in that said thermal spray treatment is selected from:
 a cold spray treatment in which solid powders of said second material are accelerated in a supersonic gaseous jet;
 a high velocity oxygen-fuel coating spray treatment in which at least partly melted particles of said second material are accelerated in a supersonic gaseous jet obtained from the combustion of oxygen and a fuel.

13. The device as in claim 12, wherein said coating also coats said respective coupling edges.

14. The device as in claim 12, wherein on at least one of said edges a housing seating is provided, configured to house a sealing element.

15. The device as in claim 14, wherein said coating extends up to an external margin of said housing seating.

* * * * *